US012115396B2

(12) United States Patent
Townsend et al.

(10) Patent No.: US 12,115,396 B2
(45) Date of Patent: Oct. 15, 2024

(54) DEMAND REGULATOR

(71) Applicant: DRAEGER SAFETY UK LIMITED, Blyth Northumberland (GB)

(72) Inventors: Paul Nicholas Townsend, Cramlington Northumberland (GB); Lee Kevin Brimer, Newcastle Upon Tyne (GB)

(73) Assignee: DRAEGER SAFETY UK LIMITED, Northumberland (GB)

( * ) Notice: Subject to any disclaimer, the term of this patent is extended or adjusted under 35 U.S.C. 154(b) by 903 days.

(21) Appl. No.: 17/254,081

(22) PCT Filed: Jun. 24, 2019

(86) PCT No.: PCT/GB2019/051784

§ 371 (c)(1),
(2) Date: Dec. 18, 2020

(87) PCT Pub. No.: WO2020/002898

PCT Pub. Date: Jan. 2, 2020

(65) Prior Publication Data

US 2021/0260412 A1 Aug. 26, 2021

(30) Foreign Application Priority Data

Jun. 27, 2018 (GB) .................................. 1810558.5

(51) Int. Cl.
*A62B 9/00* (2006.01)
*A62B 7/04* (2006.01)
(Continued)

(52) U.S. Cl.
CPC ................ *A62B 9/022* (2013.01); *A62B 7/04* (2013.01); *A62B 9/04* (2013.01)

(58) Field of Classification Search
CPC ........... A62B 9/022; A62B 9/025; A62B 9/00; A62B 7/04; A61M 16/06; A61M 16/00; A61M 16/20; A61M 16/201
See application file for complete search history.

(56) References Cited

U.S. PATENT DOCUMENTS

| | | | |
|---|---|---|---|
| 4,693,242 | A | 9/1987 | Biard |
| 5,357,950 | A | 10/1994 | Wippler et al. |
| 8,166,974 | B2 | 5/2012 | Pedemonte |

FOREIGN PATENT DOCUMENTS

| | | | |
|---|---|---|---|
| CN | 104955529 | A | 9/2015 |
| CN | 107837470 | A | 3/2018 |

(Continued)

OTHER PUBLICATIONS

International Search Report, dated Sep. 20, 2019, and Written Opinion issued in International Application No. PCT/GB2019/051784.

(Continued)

*Primary Examiner* — Michael R Reid
*Assistant Examiner* — Sarah B Lederer
(74) *Attorney, Agent, or Firm* — Saul Ewing LLP

(57) ABSTRACT

A demand regulator for a breathing apparatus. The demand regulator comprises: a flow regulation mechanism for regulating a flow of breathing gas, the flow regulation mechanism having a closed configuration in which breathing gas flow is substantially prevented; a connection mechanism for releasably connecting the flow regulator to a breathing mask, the connection mechanism comprising a release actuator for releasing the connection mechanism; a latch configured to be activated to thereby releasably retain the flow regulation mechanism in the closed configuration; a first latch activation mechanism configured for manual actuation by a user to thereby activate the latch; and a second latch activation mechanism configured to be actuated by the (Continued)

release actuator of the connection mechanism to thereby activate the latch during release of the connection mechanism.

12 Claims, 3 Drawing Sheets

(51) Int. Cl.
*A62B 9/02* (2006.01)
*A62B 9/04* (2006.01)

(56) References Cited

FOREIGN PATENT DOCUMENTS

| | | | | | |
|---|---|---|---|---|---|
| DE | 4418788 | A1 | | 11/1995 | |
| DE | 102005058401 | B3 | | 8/2007 | |
| GB | 2282213 | A | | 3/1995 | |
| GB | 2315117 | A | * | 1/1998 | ............. A62B 9/022 |
| WO | 9532023 | A1 | | 11/1995 | |

OTHER PUBLICATIONS

UK Search Report, dated Dec. 14, 2018, issued in priority GB Application No. 1810558.5.
English translation of Search Report and Office Action issued in corresponding Chinese Application No. 2019800451172.

* cited by examiner

DEMAND REGULATOR

CROSS-REFERENCE TO RELATED APPLICATIONS

This application claims the priority of International Application No. PCT/GB2019/051784, filed on Jun. 24, 2019, which claims priority to GB Application No. 1810558.5, filed on Jun. 27, 2018, the entire contents of which being fully incorporated herein by reference.

BACKGROUND OF THE INVENTION

The present disclosure concerns demand regulators, also known as lung demand valves, for breathing apparatus.

In self-contained breathing apparatuses (SCBAs), a demand regulator is typically provided to deliver breathing gas to the user in response to the user inhaling. In order to actuate the demand regulator in response to an inhalation, the demand regulator typically comprises a flexible diaphragm which is exposed on a first side to the user's breathing and on a second side to the ambient air. Accordingly, when a user inhales, the pressure on the user side of the diaphragm decreases relative to the ambient pressure and the force resulting from this pressure gradient moves the diaphragm and actuates a valve to provide an increased flow of breathing air to the user.

In some systems, a positive pressure mode is used, whereby the diaphragm is acted upon by a positive pressure spring which is balanced against the force of a spring loaded exhalation valve such that a positive pressure is maintained within the facemask, so as to inhibit the ingress of contaminants into the mask. However, it is desirable to be able to switch off the positive pressure mode in order to prevent leakage of breathing gas, for example when the breathing apparatus is not in use. Some known systems can be unreliable at providing effective switch-off of positive pressure.

Accordingly, it will be understood that improvements are desirable in the field of flow regulation valves for breathing apparatus.

SUMMARY OF THE INVENTION

According to a first aspect, there is provided a demand regulator for a breathing apparatus comprising: a flow regulation mechanism for regulating a flow of breathing gas, the flow regulation mechanism having a closed configuration in which breathing gas flow is substantially prevented; a connection mechanism for releasably connecting the flow regulator to a breathing mask, the connection mechanism comprising a release actuator for releasing the connection mechanism; a latch configured to be activated to thereby releasably retain the flow regulation mechanism in the closed configuration; a first latch activation mechanism configured for manual actuation by a user to thereby activate the latch; and a second latch activation mechanism configured to be actuated by the release actuator of the connection mechanism to thereby activate the latch during release of the connection mechanism.

The flow regulation mechanism may be an assembly configured to regulate the flow of breathing gas to be delivered to a user of a breathing face mask. The demand regulator may also or alternatively be known as a lung demand valve. The flow regulation mechanism may have an open position in which a maximum flow or flow rate of breathable gas is permitted. The flow regulation mechanism may be continuously moveable between the closed and open positions so as to regulate or adjust a flow rate of breathable gas.

The connection mechanism may be a locking connection mechanism. The release actuator may be a user interface element which can be actuated by a user so as to disengage a locking mechanism to thereby permit release of the demand regulator from a breathing mask. The connection mechanism may comprise one or more hooking elements which may engage complementary features of the mask so as to prevent release of the demand regulator from the mask.

The latch may be a latching mechanism. The latch may have an activated position in which it releasably retains the flow regulation mechanism in the closed position. The latch activation mechanisms may move the latch to the activated position. In the closed configuration, the components of the flow regulation mechanism may each have a closed position. The latch may retain one or more components of the flow regulation mechanism in its respective closed position such that the flow regulation mechanism as a whole is retained in the closed configuration. The flow regulation mechanism may comprise a flow regulation valve, and the latch may comprises a valve latch for latching the flow regulation valve in the closed position.

The flow regulation mechanism may comprise a diaphragm configured to actuate a flow regulation valve in response to a user inhalation. When the flow regulation mechanism is in the closed configuration, the diaphragm may have a closed position. When the diaphragm in its closed position, the flow regulation valve may substantially prevent breathing gas flow. More generally, when the diaphragm is in its closed position, the flow regulation mechanism may be in its closed configuration.

The latch may comprise a lever element configured to move one or more elements of the flow regulation mechanism to its respective closed position, in response to actuation of either of the first or second latch activation mechanisms, to thereby move the flow regulation mechanism to its closed configuration. In particular, the lever element may move the diaphragm to the closed position in response to actuation of either of the first or second latch activation mechanisms. In some examples, the lever element may move the flow regulation mechanism to the closed configuration by moving a valve actuating lever to the closed position in response to actuation of either of the first or second latch activation mechanisms.

The latch may further comprises an axially-movable rod configured to rotate the lever element in response to axial movement of the rod in a first axial direction. A first axial end of the rod, which may be the end of the rod in the first axial direction, may be configured to engage the latch or a component thereof, such as the lever element. The rod may be moved in the first axial direction by actuation of the first or second latch activation mechanisms. The lever element may comprise a lifting arm and an actuating arm arranged about a lever pivot axis. The lifting arm may be configured to engage one or more elements, in particular the diaphragm, of the flow regulation mechanism so as to move it or them to their closed position. The actuating arm may be configured to be engaged by the rod so as to rotate the lever element, and in particular the lifting arm, about the lever pivot axis. The lifting arm may be longer than the actuating arm, such that an angular rotation of the lever element about the lever pivot axis results in a longer movement of a distal end of the lifting arm than the distal end of the actuating arm. Accordingly, a small axial movement of the rod while in engagement with the actuating arm may be multiplied by the lever ratio between the actuating and lifting arms to thereby result in a relatively large movement of the lifting arm.

The rod may be biased towards the second axial direction, for example by a spring element. Accordingly, after actuation of one of the first or second activating mechanisms, the rod may return to a rest position towards the second axial direction.

The first latch activation mechanism may comprises a depressible button or switch configured to move the rod axially in the first axial direction in response to depression of the button or switch. The button or switch may be configured to apply a force to the second axial end of the rod, which is the end of the rod in the second axial direction. The button or switch may be directly connected to the second axial end of the rod.

The rod may comprise a flange. The flange may be radially extending. The release actuator may comprise a pivotable element configured to engage the flange so as to axially move the rod in the first axial direction in response to pivoting of the pivotable element. The pivotable element may be configured so as to be pivoted in response to the actuation of the release actuator by the user.

The pivotable release element may comprise a mask-connecting portion and a flange-engaging portion arranged with a pivot axis therebetween. The mask-connecting portion may comprise one or more hooking elements as described above. Pivoting of the pivotable element about the pivot axis in a first pivoting direction may cause the flange-engaging portion to engage the flange so as to axially move the rod in the first axial direction and cause the mask connecting portion to move to a release position in which connection of the demand regulator to the mask may be released.

The pivotable element may be biased towards a second pivoting direction about the pivot axis. The pivotable element may have a rest position towards which it is biased, in which the mask-connecting portion is in a locking position in which the connection to the mask is locked and in which the flange-engaging portion does not urge the rod towards its first axial direction.

The latch may comprise a detent configured to releasably retain secure the latch in an activated position. Accordingly, either of the first or second latch activation mechanisms may be actuated to move the latch to its activated position and the latch will then be retained in the activated position by the detent after de-actuation of the latch activation mechanisms. In particular, the detent may be configured to releasably retain the lever element in an activated position in which one or more elements of the flow regulation mechanism, and in particular the diaphragm, is supported in the closed position by the lever element.

The detent may be configured such that a retaining force applied by the detent may be overcome by a force applied to the diaphragm during a user inhalation.

The demand regulator may further comprise a positive pressure activation mechanism. The positive pressure activation mechanism may be selectively activated by the user so as to configure the flow regulation mechanism in a positive pressure mode. In the positive pressure mode, the flow regulation mechanism may provide a pressure balance to maintain an interior pressure of a breathing mask to which the demand regulator is attached at a greater pressure than ambient pressure. Actuation of either of the first or second latch activation mechanisms may deactivate the positive pressure mode of the flow regulation mechanism.

The flow regulation mechanism may comprise a positive pressure spring configured to bias the flow regulation mechanism into a positive pressure configuration. In a particular example, the positive pressure spring may bias the diaphragm to provide a balance point relative to an exhalation valve lift-off pressure so as to maintain an interior pressure of a breathing mask to which the demand regulator is attached at a greater pressure than ambient pressure. Activation of the latch may overcome the biasing force of the positive pressure spring so as to move the diaphragm to the closed position. After de-activation of the latch, the diaphragm may be urged back into the positive pressure position by the positive pressure spring.

A demand regulator may also be known as a lung demand valve or a second stage pressure reduction valve. The breathing apparatus may be a self-contained breathing apparatus or SCBA.

According to a second aspect, there is provided a breathing apparatus comprising a demand regulator according to the first aspect above.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the accompanying Figures, in which.

DETAILED DESCRIPTION OF THE INVENTION

Figure 1:
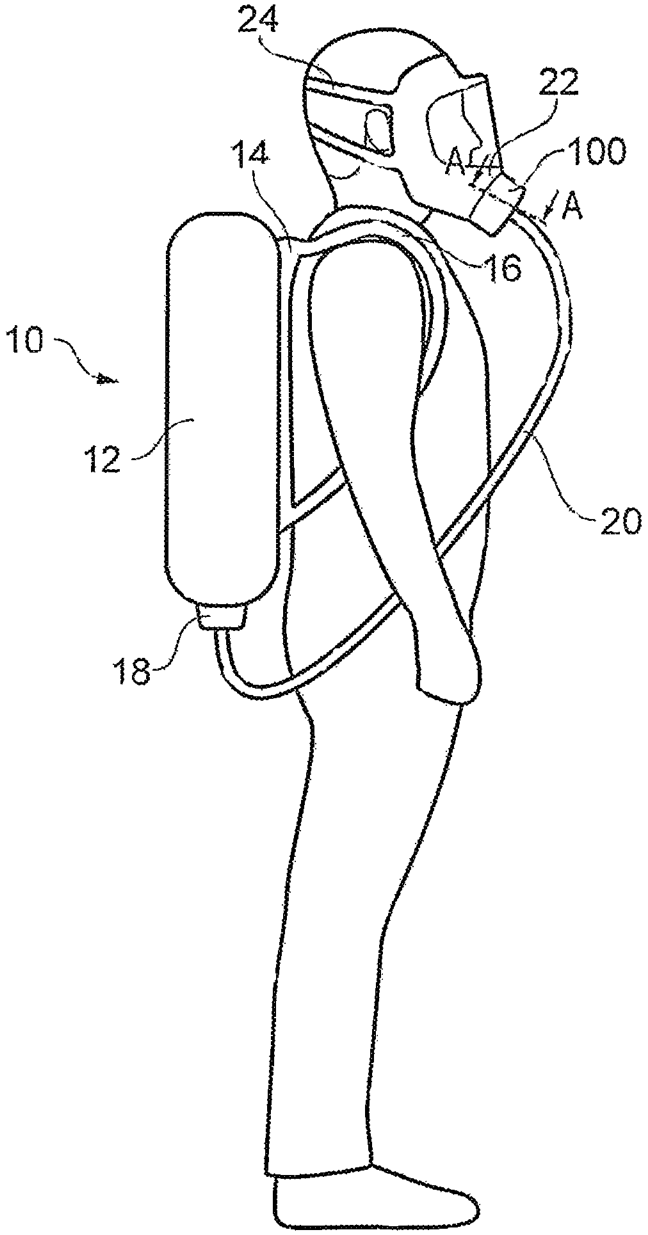
FIG. 1 shows an exemplary breathing apparatus comprising an exemplary demand regulator.

FIG. 1 shows an example of a breathing apparatus 10 worn by a user. The breathing apparatus 10 is a self-contained breathing apparatus (SCBA) in this example, but it should be understood that the present disclosure extends to other breathing apparatuses including, but not limited to closed-circuit breathing apparatus (CCBA) and self-contained underwater breathing apparatus (SCUBA).

The breathing apparatus 10 comprises a source of breathing gas 12, in this case a pressurised cylinder of breathing gas 12, which is configured to be supported on a harness 14 which can be worn by the user using shoulder straps 16. The cylinder 12 is connected to a first stage pressure reducer 18, which receives breathing gas at a first, high, pressure from the cylinder 12 and reduces the breathing gas to a second, medium pressure and delivers it to a breathing gas hose 20. The breathing gas hose is connected at its distal end to a demand regulator 100 and delivers the breathing gas at the medium pressure to the demand regulator 100. The demand regulator 100, which will be described in more detail below, is in turn connected to a breathing face mask 22 which is worn by the user using straps 24. Accordingly, it should be understood that the breathing apparatus 10 is generally configured to deliver breathing gas to the user from the source of breathing gas 12.

Figure 2:
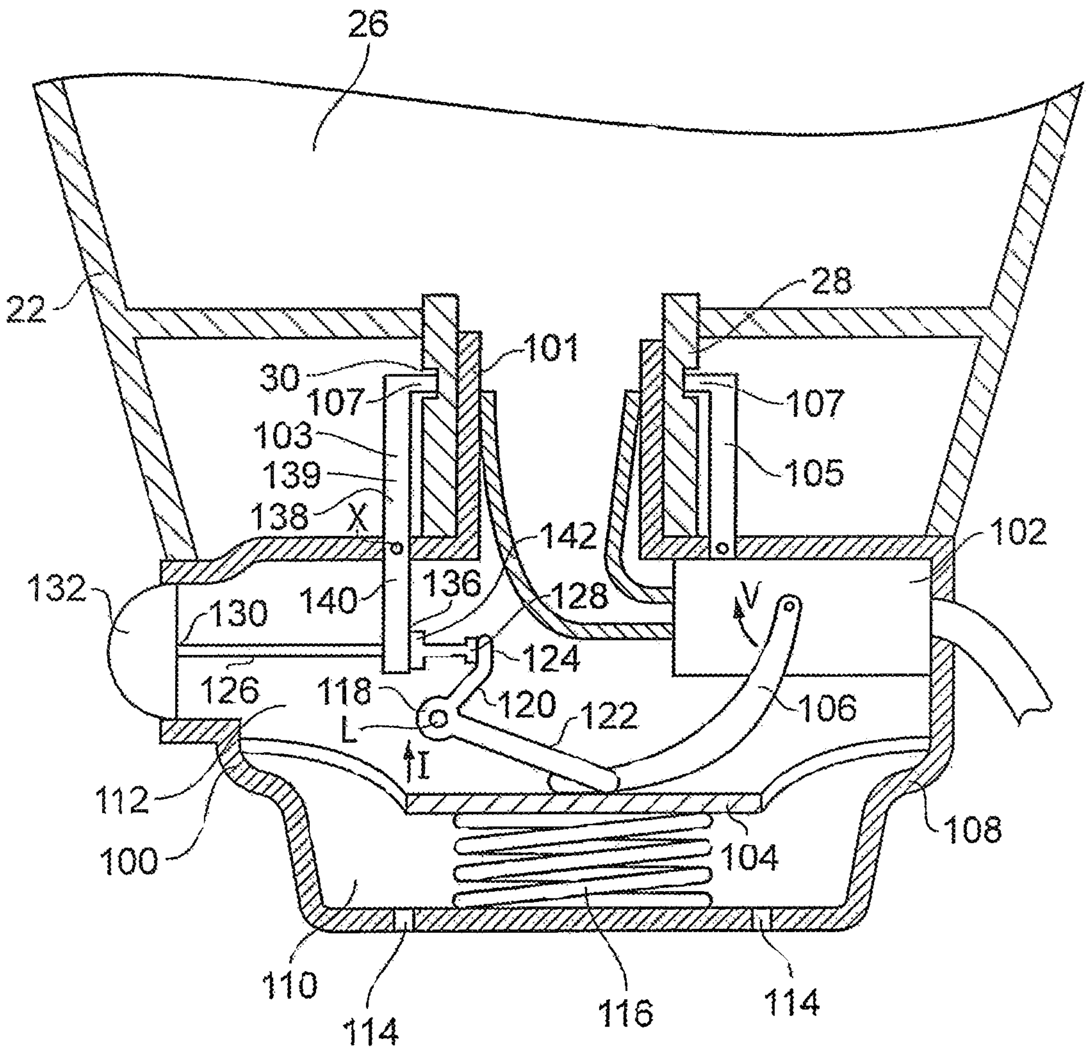
FIG. 2 shows a cross-sectional view of an exemplary demand regulator in a first configuration.

The demand regulator 100 is shown in more detail in FIG. 2. In particular, FIG. 2 shows a cross-sectional view of the demand regulator 100 and a portion of the face mask 22 as viewed on the plane AA shown in FIG. 1 in the direction of the arrows.

The demand regulator 100 is generally configured to deliver breathing gas to the face mask 22. The demand regulator is shown in FIG. 2 in a positive pressure mode or configuration, in which a face mask cavity 26 and regulator cavity 112 are maintained at a positive pressure with respect to the ambient environment to inhibit the ingress of contamination.

The demand regulator 100 comprises a connection mechanism comprising a male port 101 which is received within a female port 28 of the face mask 22 to thereby releasably connect the demand regulator 100 to the face mask 22. The female port 28 of the face mask 22 comprises an annular recess 30. The connection mechanism further comprises first and second release actuators 103 and 105 for selectively locking or releasing the connection mechanism from the face mask 22. In particular, the release actuators 103, 105 each comprise a locking hook 107 which is configured to extend into the annular recess 30 to thereby prevent release of the demand regulator 100 from the mask 22. Both of the release actuators 103, 105 must be actuated by the user to pivot the actuators 103, 105 (see arrows P in FIG. 3) such that their respective hooks 107 are withdrawn from the annular recess 30 to thereby permit release of the demand regulator 100 from the mask 22. Of course, in some examples, only a single release actuator may be provided.

The demand regulator comprises a flow regulation mechanism which comprises a flow regulation valve 102, a diaphragm 104, and a valve actuating lever 106. The demand regulator 100 has a housing 108. The diaphragm 104 is a resiliently deformable disk. The housing 108 is divided into an ambient cavity 110 and a regulator cavity 112 by the diaphragm 104. The ambient cavity 110 is in communication with the ambient environment via openings 114. The diaphragm 104 sealingly separates the cavities 110,112 and can move relative to the housing 108. Accordingly, the diaphragm is 104 is exposed on a first side to the static pressure in the ambient cavity 110 and on a second side to the static pressure in the regulator cavity 112. Accordingly, when a user inhales, the static pressure in the regulator cavity 112 reduces relative to the ambient pressure in the ambient cavity 110, and the resulting pressure gradient causes the diaphragm 104 to move inwardly towards the regulator cavity 112 in the direction of arrow I.

The valve actuating lever 106 is in contact with the diaphragm 104 and is pivotably connected to the flow regulation valve 102. Pivoting of the lever 106 with respect to the valve 102 causes an adjustment of the flow rate of breathing gas through the valve 102. In particular, clockwise movement of the lever 106 as shown by arrow V in FIG. 2 will cause the valve 102 to open to a greater extent and thereby increase breathing gas flow rate into the mask 22 and its face mask cavity 26.

Accordingly, when a user inhales and the diaphragm 104 moves in the direction of arrow I, the lever 106 is pivoted in the direction V and the valve 102 opens to permit an increased flow of breathing gas to the user to be inhaled. When the user ceases inhaling, flow from the valve 102 will continue until a sufficient positive pressure is achieved within the face mask cavity 26 that the diaphragm 104 is returned to the position shown in FIG. 2, compressing the positive pressure spring 116 and closing the valve 102. Consequently, when the user ceases inhaling the lever 106 will rotate in the opposite direction to arrow V and thereby reduce the flow rate of the valve 102. Therefore, the breathing gas flow rate into the mask increases and decreases automatically in response to a user inhalation to deliver a proportional demand of air to the user for inhalation.

In this example, the demand regulator 100 has a positive pressure configuration. The demand regulator further comprises a positive pressure spring 116 which is configured to bias the diaphragm into an open position in the direction of arrow I. In order to maintain the positive pressure within the regulator 100 and the face mask cavity 26, an outlet valve from the face mask cavity 26 (not shown) prevents the exhaust of breathing gas when the static pressure in the face mask cavity 26 is below a predetermined positive pressure.

When the user finishes inhaling, the spring 116 will initially maintain the diaphragm 104 in a position in which the valve 102 will continue introducing air into the face mask cavity 26 (and the connected regulator cavity 112). As breathing gas continues to be introduced in to the mask and regulator cavity 112, the pressure inside will increase until it is sufficient to overcome the biasing force of the positive pressure spring 116 and move the diaphragm 104 to the position shown in FIG. 2. At this point, the diaphragm 104 will be in a position such that the valve 102 will no longer permit flow into the mask, but the positive pressure in the mask will be maintained due to the biased outlet valve of the mask.

Figure 3:
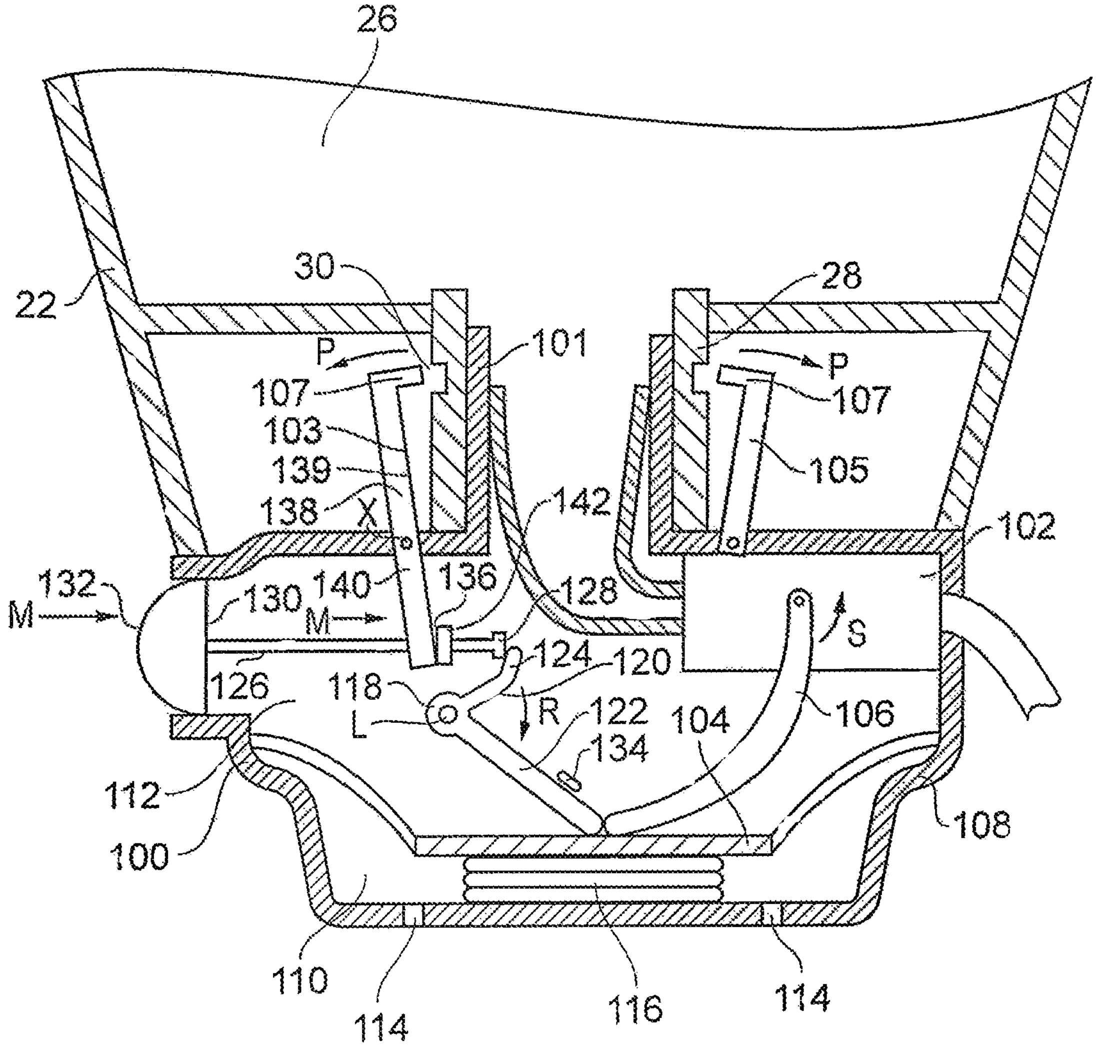
FIG. 3 shows a cross-sectional view of the exemplary demand regulator of FIG. 1 in a second configuration.

Referring additionally now to FIG. 3, a latch 118 is provided for releasably retaining the flow regulation mechanism in a closed configuration. FIG. 3 illustrates the demand regulator 100 and, more specifically, the flow regulation mechanism (comprising valve 102, diaphragm 104, and lever 106) in the closed configuration. In the closed configuration, the valve 102 substantially prevents breathing gas flow and each of the valve 102, diaphragm 104, and lever 106 has a respective closed position, which is illustrated in FIG. 3. In some examples, movement of any of the valve 102, diaphragm 104, and lever 106 to their respective closed position may force the others of the valve 102, diaphragm 104, and lever 106 to their respective closed positions. Therefore, while in this example, the latch 118 acts directly on the diaphragm 104, in other examples, the latch may act on the lever 106 or the valve 102 and have the same effect as described herein.

In this example, the latch 118 comprises a lever element 120 having a lifting arm 122 which is configured to contact the diaphragm 104 to thereby move the diaphragm 104 to its closed position as shown in FIG. 3. In other examples, the lever element 120 and its lifting arm 122 may contact the valve actuating lever 106 to move it to its closed position (as shown in FIG. 3), thereby also moving the diaphragm 104 indirectly. The lever element also comprises an actuating arm 124. The lifting arm 122 and the actuating arm 124 are arranged about and extend generally radially from a lever pivot axis L such that they are pivotable about the axis L. The actuating arm 124 is shorter in length than the lifting arm 122, meaning an angular rotation of the lever element 120 about the lever pivot axis L results in a longer movement of a distal end of the lifting arm 122 than the distal end of the actuating arm 124.

The latch 118 also comprises an axially-moveable rod 126. The rod 126 has a first axial end 128 which is configured to engage the actuating arm 124 of the lever element 120. At its second axial end 130, a depressible button 132 is provided. The user can depress the button 132 to thereby axially move the rod in a first axial direction towards its first axial end 128, as illustrated by arrows M in FIG. 3. Accordingly, it will be understood that depression of the button 132 causes the rod 126 to move axially in the direction M, and apply a force so as to pivot the actuating arm 124 of the lever element 120 in a first pivoting direction, shown by arrow R in FIG. 3. This in turn causes the lifting arm 122 to likewise rotate and apply a force to the diaphragm 104 to lift it to its closed position, thereby closing the valve 102 via the valve actuating lever 106 (see arrow S). Owing to the difference in lever arms between the arms 122, 124, a small axial movement of the rod 126 while in engagement with the actuating arm 124 is multiplied by the lever ratio to thereby result in a relatively large movement of the lifting arm 122 to lift the diaphragm 104 to the closed position. The demand regulator 100, and in particular the latch 118, further comprises a detent 134 which is configured to releasably retain the latch 118 in the activated position as shown in FIG. 3. The rod 126 may be biased towards its second axial end 130 such that, after activation of the latch 118, the lever element 120 is retained by the detent 134 and the rod returns to a rest position as shown in FIG. 2.

In this example, the detent 134 applies a retaining force on the lever element 120 to retain it in the activated (i.e. lifted) position, but it should be understood that other detents may be used. The detent 134 may be configured such that its retaining force may be overcome by a force applied to the diaphragm 104 during a user inhalation to thereby return the regulator to the positive pressure configuration as shown in FIG. 2.

The depressible button 132 therefore forms a first latch activation mechanism 132 configured for manual actuation by a user to thereby activate the latch 118. The latch 118 acts against the biasing force of the positive pressure spring 116 to thereby move the diaphragm 104, and the flow regulation mechanism as a whole, to its closed position. Accordingly, when the latch 118 is activated, the flow regulation mechanism is closed and no breathing gas will flow. As such, if the user requires the flow of breathing gas to be ceased, for example if the user is to remove the mask, then the user can manually activate the latch using button 132 to thereby activate the latch 118 and prevent breathing gas flow.

The demand regulator 100 further comprises a second latch activation mechanism 136 for activating the latch 118. The second latch activation mechanism 136 is configured to be actuated by the release actuator 103 of the connection mechanism to thereby activate the latch 118 during release of the connection mechanism. The release actuator 103, as shown in FIGS. 2 and 3, comprises a pivotable release element 138 comprising a mask-connecting portion 139 having the locking hook 107 formed at a distal end thereof and a flange-engaging portion 140. The portions 139,140 extend in generally opposing directions from a release pivot axis X therebetween about which the release element 138 can pivot.

In this example, the rod 126 comprises a radially-extending flange 142. The flange-engaging portion of the release element 138 is configured to engage with the flange 142. When the release actuator 103 is actuated by a user to release the regulator 100 from the mask 22, the release element 138 is pivoted in direction P about the axis to withdrawn its hook 107 from the recess 30. This in turn also causes the flange-engaging portion 140 to apply a force on the flange 142 to thereby move the rod 126 axially in the direction M. Accordingly, during a release operation by the user to disconnect the regulator 100 from the mask 22, the latch 118 will be activated automatically to move the flow regulation mechanism to the closed configuration. This will prevent breathing gas leakage when the demand regulator 100 is disconnected from the mask.

Accordingly, the demand regulator of this disclosure provides two latch activation mechanisms for activating a single latch. The regulator of the disclosure provides significant advantages for users of breathing apparatus. In particular, the two separate latch activation mechanisms allows for reliable switching-off of the positive pressure breathing gas flow regardless of the user's method of operation of the breathing apparatus. If the user doffs the apparatus by disconnecting the regulator from the mask, then the second latch activation mechanism will automatically activate the latch to prevent breathing gas leakage and will prevent accidental reactivation of the positive pressure since the release actuator has to be kept depressed to allow removal of the regulator from the mask. If the user alternatively doffs the set without disconnecting the regulator from the mask, then the user can manually use the first latch activation mechanism (e.g. the manual button) to activate the latch to provide switch-off even when the release actuator is not used.

Furthermore, if reset of the positive pressure is required during use then the first latch activation mechanism can be used without the risk of inadvertent partial disconnection of the regulator from the mask, as might happen if only the release actuator latch activation mechanism were provided. Accordingly, by providing both the first and second latch activation mechanisms disclosed herein, the regulator of the invention may provide a safer and more reliable demand regulator with positive pressure function and reduced leakage.

Although it is referred to as a demand regulator, the regulator 100 may also be known as a lung demand valve or a second stage pressure reduction valve.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For the avoidance of doubt, the present disclosure includes the subject matter recited in the following numbered Paras:

Para 1. A demand regulator for a breathing apparatus comprising:
- a flow regulation mechanism for regulating a flow of breathing gas, the flow regulation mechanism having a closed configuration in which breathing gas flow is substantially prevented;
- a connection mechanism for releasably connecting the flow regulator to a breathing mask, the connection mechanism comprising a release actuator for releasing the connection mechanism;
- a latch configured to be activated to thereby releasably retain the flow regulation mechanism in the closed configuration;
- a first latch activation mechanism configured for manual actuation by a user to thereby activate the latch; and
- a second latch activation mechanism configured to be actuated by the release actuator of the connection mechanism to thereby activate the latch during release of the connection mechanism.

Para 2. A demand regulator as claimed in Para 1, wherein the flow regulation mechanism comprises a diaphragm configured to actuate a flow regulation valve in response to a user inhalation, and wherein, in the closed configuration, the diaphragm has a closed position in which the flow regulation valve substantially prevents breathing gas flow.

Para 3. A demand regulator as claimed in Para 2, wherein the latch comprises a lever element configured to move the diaphragm to the closed position in response to actuation of either of the first or second latch activation mechanisms.

Para 4. A demand regulator as claimed in Para 3, wherein the latch further comprises a axially-movable rod configured to rotate the lever element in response to axial movement of the rod in a first axial direction.

Para 5. A demand regulator as claimed in Para 4, wherein the rod is biased towards the second axial direction.

Para 6. A demand regulator as claimed in Para 4 or 5, wherein the first latch activation mechanism comprises a depressible button or switch configured to move the rod axially in the first axial direction in response to depression of the button or switch.

Para 7. A demand regulator as claimed in Para 4, 5, or 6, wherein the rod comprises a flange, and wherein the release actuator comprises a pivotable element configured to engage the flange so as to axially move the rod in the first axial direction in response to pivoting of the pivotable element.

Para 8. A demand regulator as claimed in Para 7, wherein the pivotable release element comprises a mask connecting portion and a flange engaging portion arranged with a pivot axis therebetween, wherein pivoting of the pivotable element in a first pivoting direction causes the flange-engaging portion to engage the flange so as to axially move the rod in the first axial direction and causes the mask connecting portion to move to a release position in which connection of the demand regulator to the mask may be released.

Para 9. A demand regulator as claimed in Para 8, wherein the pivotable element is biased towards the second pivoting direction.

Para 10. A demand regulator as claimed in any preceding Para, wherein the latch comprises a detent configured to releasably retain secure the latch in an activated position.

Para 11. A demand regulator as claimed in any preceding Para, wherein the flow regulation mechanism comprises a flow regulation valve and wherein the latch comprises a valve latch for latching the flow regulation valve in the closed position.

Para 12. A breathing apparatus comprising a demand regulator according to any of the preceding Paras.

The invention claimed is:

1. A demand regulator for a breathing apparatus comprising:

a flow regulation mechanism for regulating a flow of breathing gas, the flow regulation mechanism having a closed configuration in which breathing gas flow is substantially prevented;

a connection mechanism for releasably connecting the flow regulation mechanism to a breathing mask, the connection mechanism comprising a release actuator for releasing the connection mechanism;

a latch configured to be activated to thereby releasably retain the flow regulation mechanism in the closed configuration;

a first latch activation mechanism configured for manual actuation by a user to thereby activate the latch independently of the release actuator, so that a connection between the flow regulation mechanism and the breathing mask is maintained; and a second latch activation mechanism configured to be actuated by the release actuator of the connection mechanism to thereby activate the latch during release of the connection mechanism.

2. A demand regulator as claimed in claim 1, wherein the flow regulation mechanism comprises a diaphragm configured to actuate a flow regulation valve in response to a user inhalation, and wherein, in the closed configuration, the diaphragm has a closed position in which the flow regulation valve substantially prevents breathing gas flow.

3. A demand regulator as claimed in claim 2, wherein the latch comprises a lever element configured to move the diaphragm to the closed position in response to actuation of either of the first or second latch activation mechanisms.

4. A demand regulator as claimed in claim 3, wherein the latch further comprises a axially-movable rod configured to rotate the lever element in response to axial movement of the rod in a first axial direction.

5. A demand regulator as claimed in claim 4, wherein the rod is biased towards the second axial direction.

6. A demand regulator as claimed in claim 4, wherein the first latch activation mechanism comprises a depressible button or switch configured to move the rod axially in the first axial direction in response to depression of the button or switch.

7. A demand regulator as claimed in claim 4, wherein the rod comprises a flange, and wherein the release actuator comprises a pivotable element configured to engage the flange so as to axially move the rod in the first axial direction in response to pivoting of the pivotable element.

8. A demand regulator as claimed in claim 7, wherein the pivotable release element comprises a mask connecting portion and a flange engaging portion arranged with a pivot axis therebetween, wherein pivoting of the pivotable element in a first pivoting direction causes the flange-engaging portion to engage the flange so as to axially move the rod in the first axial direction and causes the mask connecting portion to move to a release position in which connection of the demand regulator to the mask may be released.

9. A demand regulator as claimed in claim 8, wherein the pivotable element is biased towards the second pivoting direction.

10. A demand regulator as claimed in claim 1, wherein the latch comprises a detent configured to releasably retain the latch in an activated position.

11. A demand regulator as claimed in claim 1, wherein the flow regulation mechanism comprises a flow regulation valve and wherein the latch comprises a valve latch for latching the flow regulation valve in the closed position.

12. A breathing apparatus comprising a demand regulator according to claim 1.

* * * * *